Jan. 19, 1960 L. B. BROWDER 2,922,040

DEMODULATOR

Filed Dec. 9, 1957 4 Sheets-Sheet 1

INVENTOR.
LEWIS B. BROWDER
BY Christie, Parker & Hale
ATTORNEYS.

Jan. 19, 1960 L. B. BROWDER 2,922,040

DEMODULATOR

Filed Dec. 9, 1957 4 Sheets-Sheet 2

INVENTOR.
LEWIS B. BROWDER
BY Christie, Parker & Hale
ATTORNEYS.

Jan. 19, 1960 L. B. BROWDER 2,922,040

DEMODULATOR

Filed Dec. 9, 1957 4 Sheets-Sheet 3

INVENTOR.
LEWIS B. BROWDER

BY Christie, Parker & Hale

ATTORNEYS.

Jan. 19, 1960 L. B. BROWDER 2,922,040

DEMODULATOR

Filed Dec. 9, 1957 4 Sheets-Sheet 4

INVENTOR.
LEWIS B. BROWDER

BY Christie, Parker & Hale

ATTORNEYS.

United States Patent Office 2,922,040

Patented Jan. 19, 1960

2,922,040

DEMODULATOR

Lewis B. Browder, La Canada, Calif., assignor to Consolidated Electrodynamics Corp., Madre Villa, Pasadena, Calif., a corporation of California Application December 9, 1957, Serial No. 701,400

7 Claims. (Cl. 250—27)

This invention relates to a demodulator and more particularly to a frequency or phase modulation detector.

It is desirable for a demodulator or discriminator to provide an output signal which represents information free of any noise or undesired signals. In practice, however, noise in the form of spurious signals is present along with the desired or information signals. Many forms of noise signals are avoided when frequency or phase modulation is employed over amplitude modulation. Nevertheless, noise signals in varying amounts are present. Since noise signals occur at random and include a wide range of frequencies, they are difficult to eliminate entirely even in a frequency or phase modulated device.

It is desirable to secure a signal to noise ratio as high as possible. An ideal signal to noise ratio is infinity, but this ideal ratio is never obtained in practice because noise signals cannot be completely eliminated. It is one purpose of the present invention therefore to increase the signal to noise ratio.

According to the present invention the signal to noise ratio from the output of a frequency or phase modulation discriminator is improved by applying a frequency or phase modulated wave to a first and second network each of which provides an output signal for each zero crossing of the modulated wave, displacing the output signals of one of the networks with respect to the other by including a phase shift device, combining output signals from the two networks and filtering the combined signals to provide a signal which varies in amplitude according to the frequency or phase variations in the input wave. Since the output signal secured at the zero crossings of the wave in one of the networks is shifted with respect to the output signal secured at the zero crossings of the wave in the other network, there are four samples and hence four output signals for each cycle of the frequency modulated input wave. By combining the outputs of the first and second networks, the desired signal may be doubled. Any noise present in the frequency or phase modulated input wave also is passed through the first and second networks, but when combined and filtered, the two noise signals have a maximum amplitude which generally is of the order of or slightly greater than the square root of two times the value of the noise signal from only one network. The signal to noise ratio is improved because the amplitude of the desired output signal may be increased by a factor of two where over that of either network whereas at the same time the amplitude of any random noise signals is increased by the square root of two or 1.414 over that of either network. The noise factor approaches 1.414 as the bandwidth of the device is made larger.

In one embodiment of this invention the frequency modulated wave is amplified and applied directly to the first network and through a phase shift device to a second network. Each network includes an amplifier, clipper and a differentiator. In order to locate the zero crossing more precisely, a second amplifier and clipper are preferably employed in series with the first amplifier and clipper. The output from each differentiator is applied to a mixer which is coupled to a full wave rectifier which in turn is coupled to a low pass filter, the output signal of which represents the desired information or intelligence.

These and other features of the present invention may be more fully appreciated when considered in the light of the following specification and drawings, in which.

Figure 2:
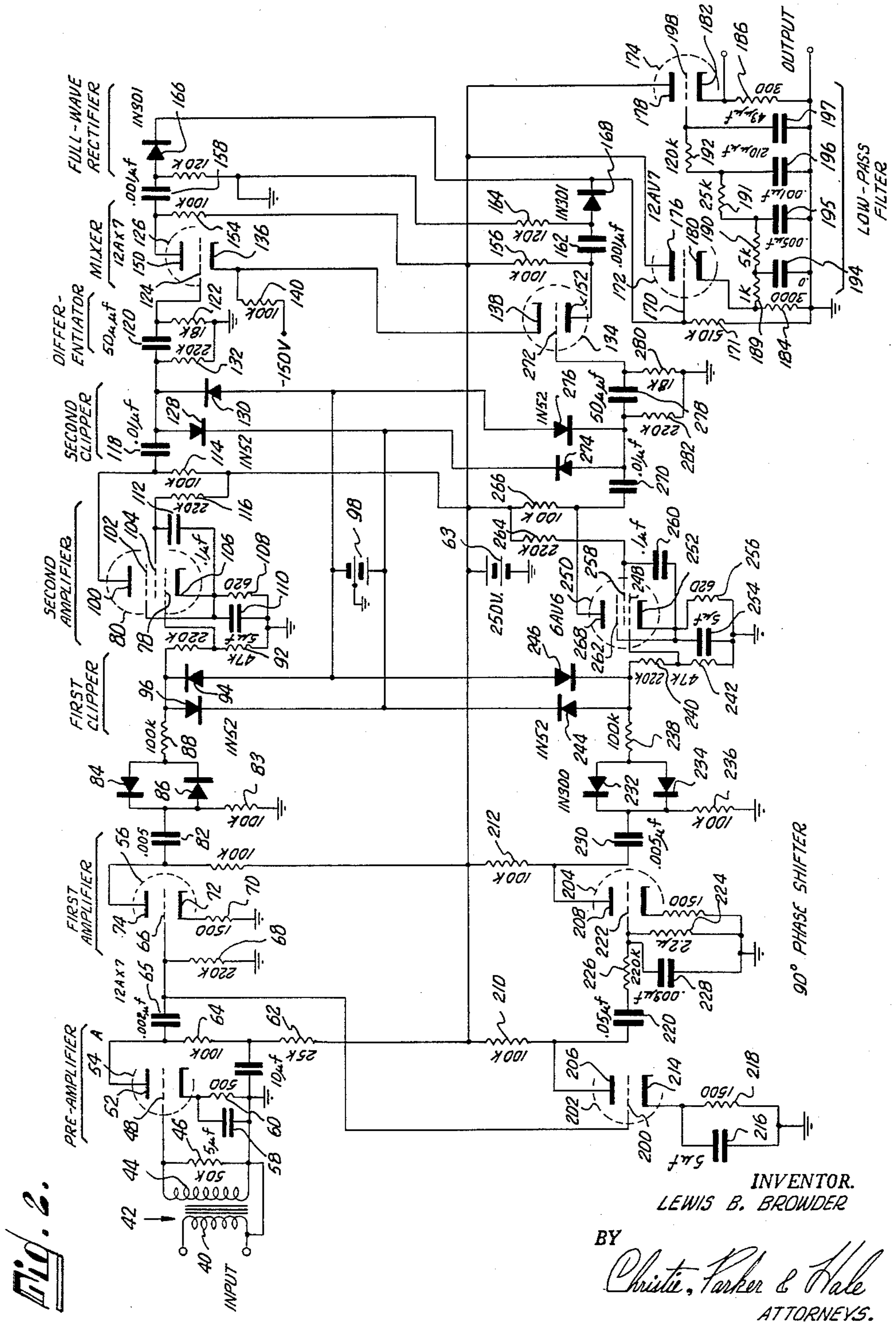
Fig. 2 is a circuit schematic illustrating in detail one arrangement of the system shown in Fig. 1.
Figure 3:
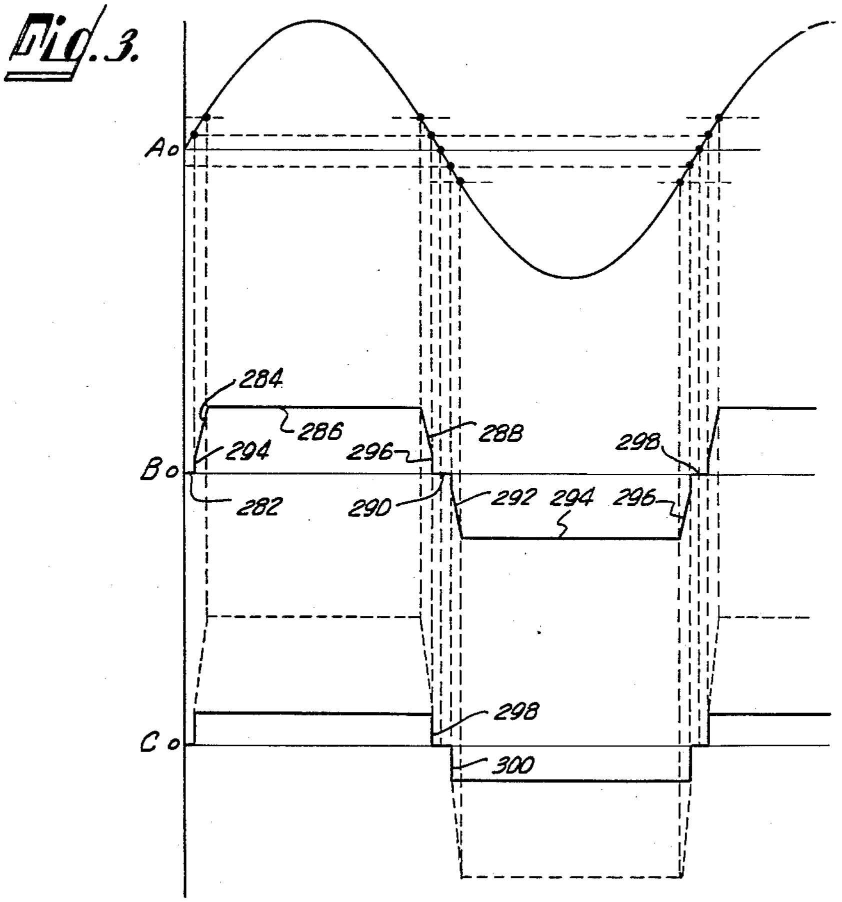
Figure 3A:
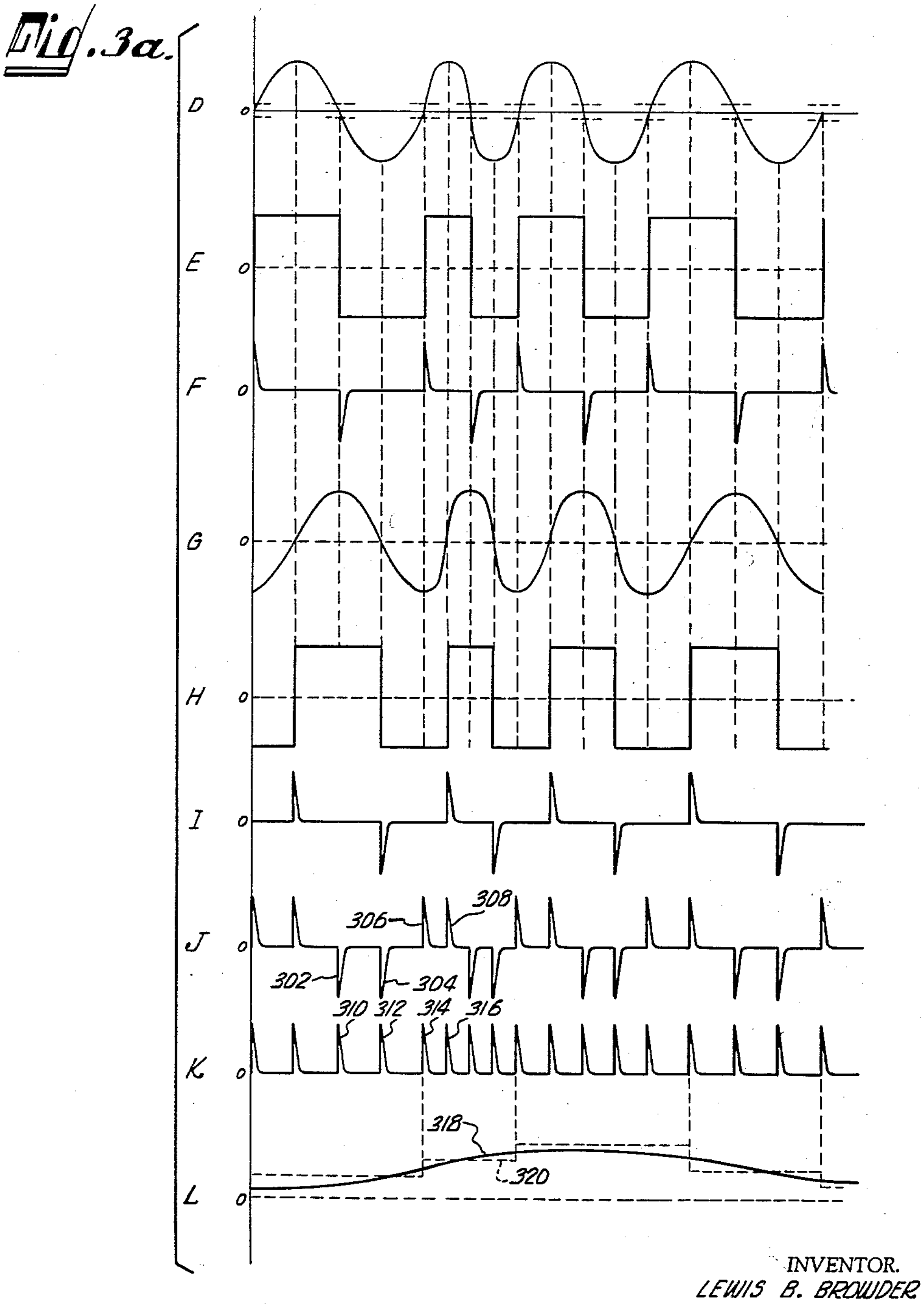

Fig. 3 and Fig. 3*a* illustrate a series of waveforms which show how a modulated input wave is treated at various points throughout the circuit of Fig. 2.

Figure 1:
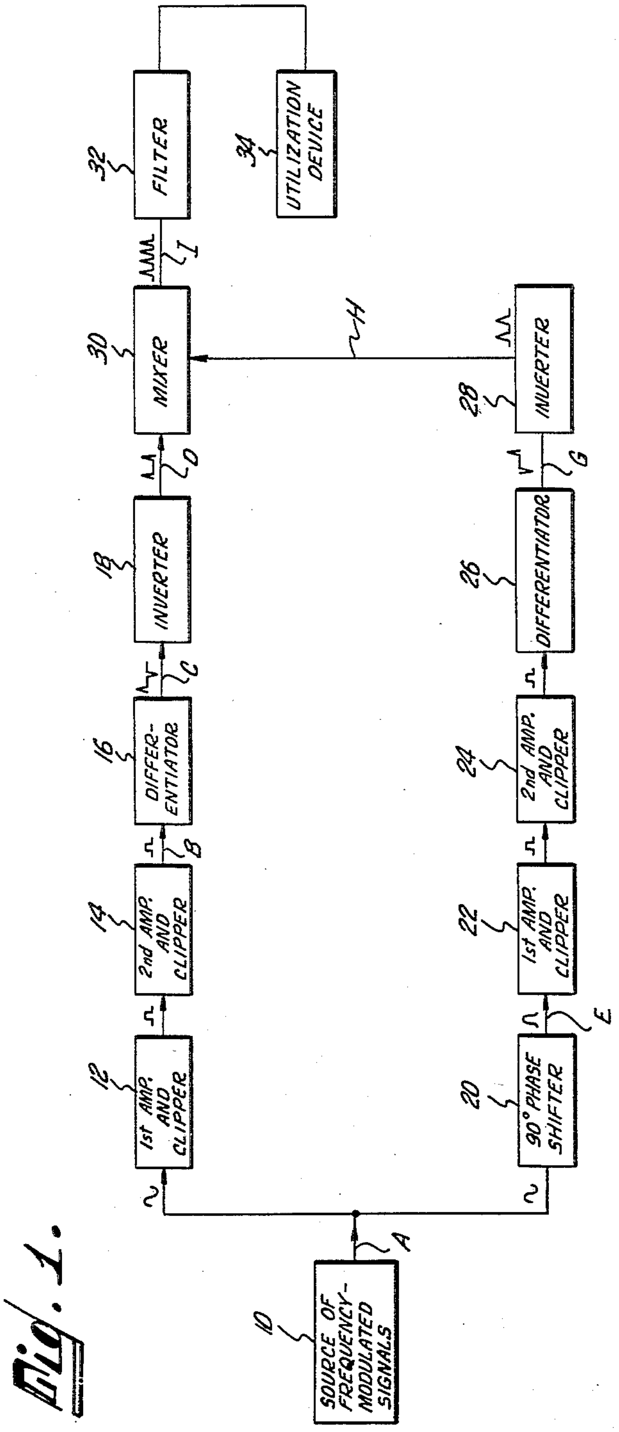
Fig. 1 is a block diagram illustrating a demodulator according to the present invention.

For an understanding of the system aspects of the present invention, reference is made to Fig. 1 which illustrates the various components in block form. A source of frequency or phase modulated signals 10 is coupled to a first network which includes a first amplifier-clipper 12, a second amplifier-clipper 14, a differentiator 16 and an inverter 18. The source of modulated signals 10 is coupled to a second network including a phase shifter 20, first amplifier-clipper 22, second amplifier-clipper 24, differentiator 26 and an inverter 28. The output signals of the inverters 18 and 28 are combined in a mixer 30 and applied to a filter 32 which supplies an intelligence signal to a utilization device 34.

The wave form at different points throughout the system is illustrated adjacent the leads connecting the various devices illustrated in block form. The sinusoidal wave from the source of frequency modulated signals 10 is amplified and clipped in the first amplifier-clipper 12. This produces a wave which is substantially square, but the leading and trailing edges are not as steep as desired. Thus, a second amplifier-clipper 14 is employed to provide an output wave form which is substantially square. This square wave is differentiated in the differentiator 16 to provide a wave form having a positive and negative voltage spike. It is desirable to invert the negative voltage spike, and for this purpose an inverter 18 is shown which in practice may be a function integrated with the circuit of the mixer.

The sinusoidal wave applied to the phase shifter 20 is shifted in phase either forward or backward. Although different angles of phase shift may be used, a phase shift of 90° is preferred, and for the subsequent discussion a phase shift of 90° is assumed. As indicated by the wave form adjacent the output of the 90° phase shifter 20, the phase shift is behind by 90°. Thus the output wave from the phase shifter 20 lags the input wave by 90°. In a similar fashion to that explained above with respect to the first network, the signal wave from the phase shifter 20 is amplified and clipped in the amplifier-clipper stages 22 and 24, and differentiated in the differentiator 26. The output wave from differentiator 26, like that of the differentiator 16, includes a positive and negative voltage spike, but the negative spike from the differentiator 26 occurs first in time and is followed by a positive spike, while the output of the differentiator 16 includes a positive spike which occurs first in time followed by a negative spike. It is desirable to invert the negative spike from the differentiator 26, and for this purpose an inverter 28 is shown which in practice may be combined in function with the mixer circuit 30. The two positive voltage spikes from the inverter 18 are displaced in phase from the two voltage spikes from the inverter 28. This phase displacement is determined by the phase shifter 20. Once combined in the mixer 30, the voltage spikes from inverters 18 and 28 provide a series of pulses to the filter 32 having a repetition rate equal to the combined pulse repetition rate of the first and second networks. The effect is to provide the filter 32 with twice the number of samples ordinarily employed in an FM discriminator. The output signal of the filter 32 varies with the number of pulses supplied to its input per unit of time. As the frequency or phase of the signal from the source of frequency or phase modulated signals 10 varies with time, the output signal wave of the filter 32 correspondingly varies in amplitude with time and represents information or intelligence. This signal may be supplied to a utilization device 34 such as a loudspeaker, recorder or the like.

By utilizing a second network which includes a phase shifter, the number of pulses supplied to the filter 32 is doubled. Accordingly, the average amplitude of the signal from the filter 32 may be doubled over what it would be if the first network were employed without the second. Random noise signals, however are not doubled in the process when the phase shifter and the second network are employed. Any noise signal in the source of frequency or phase modulated signals 10 which reaches the filter 32 when the phase shifter 20 and second network are employed is increased by a factor of 1.414. This factor may be greater than 1.414 where the random noise is limited in bandwidth so that there is a greater correlation between the two sets of zero crossings. It is seen, therefore, that when the second network is employed the desired signal is always increased by an amount which is greater than the amount by which the noise signal is increased. Thus, a desirable increase in the signal to noise ratio is accomplished.

Reference is made to Fig. 2 for a detailed description of one type of specific circuit arrangement which may be employed for the devices shown in block form in Fig. 1. A frequency or phase modulated signal wave is applied to a primary winding 40 of transformer 42, and the signal induced in the secondary winding 44 is applied across a loading resistor 46 connected between a control grid 48 and ground. A cathode 50, an anode 52, and the control grid 48 constitute one-half of a twin triode, the respective halves being designated as 54 and 56. A condenser 58 and a resistor 60, connected between the cathode 50 and ground, serve as a cathode bias network. Positive anode potential is supplied from a battery 63 through resistors 62 and 64 to the anode 52 of the vacuum tube section 54. An output signal is taken from the anode 52 and coupled through a condenser 65 to a control grid 66 of the vacuum tube section 56. A grid leak resistor 68 and a cathode resistor 70 are connected between ground and the control grid 66 and a cathode 72 respectively. Positive potential is supplied from the battery 63 to an anode 74 through a resistor 76. The vacuum tube section 56 serves to amplify the sinusoidal signals received from the vacuum tube section 54.

An A.C. signal is coupled from the anode 74 of the vacuum tube section 56 to a control grid 78 of a vacuum tube 80 through a network which includes a condenser 82, resistor 83, a pair of diodes 84 and 86, a resistor 88, a resistor 90 and a resistor 92, connected as shown. The diodes 84 and 86 are arranged to conduct only when the voltage applied thereto exceeds a predetermined minimum. In a circuit arrangement having components of the values indicated in Fig. 2, the predetermined voltage is on the order of 0.10 volt. The diodes 84 and 86 serve to prevent tube noise from actuating the system in the absence of an input signal. A pair of diodes 94 and 96 are connected between the junction of the resistors 88 and 90 to opposite sides of a battery 98. The diode 94 is connected to the battery so that its potential is at a predetermined negative value with respect to ground, and the diode 96 is connected to the battery so that its potential is at a predetermined positive level with respect to ground. In the circuit arrangement shown plus and minus 3 volts are used for the respective diodes 94 and 96. Thus the diodes 94 and 96 serve to prevent the signal level at the junction point of the resistors 88 and 90 from exceeding a predetermined potential established by the battery 98. Therefore, with the circuit values indicated the signal level applied to the control grid 78 lies between the limits of plus and minus 3 volts suitably attenuated by the resistors 90, 92 to conform to the operating limits of vacuum tube 80.

The vacuum tube 80 is a pentode which serves as an amplifier and includes an anode 100, a suppressor grid 102, a screen grid 104, the control grid 78 and a cathode 106. A resistor 108 and a condenser 110, connected between the cathode and ground serve as a cathode bias network. The suppressor grid 102 is connected to the cathode 106 and the screen grid 104 is decoupled through a condenser 112 to the cathode 106. Positive potential from the battery 63 is supplied through a resistor 114 to the anode 100 and through a resistor 116 to the screen grid 104.

The output of the amplifier 80 is coupled through a condenser 118 and a differentiating network which includes a condenser 120 and a resistor 122 to a control grid 124 of a vacuum tube triode section 126. A pair of diodes 128 and 130 serve to clip the output signal from the anode 100 at a plus or minus 3 level in the same manner previously explained with respect to the diodes 94 and 96. A diode loading resistor 132 is connected between the common connection of the diodes 128, 130 and ground. The signal applied to the differentiating network 120, 122 is substantially a square wave, having been amplified and clipped twice. Accordingly two signal spikes, one positive and one negative, are supplied to the control grid 124. The mixer includes a twin triode vacuum tube, the half section being designated as 126 and 134. Each cathode 136 and 138 of the respective half sections are connected through a common cathode resistor 140 to a source of negative potential of minus 150 volts. The anodes 150 and 152 are connected through respective resistors 154 and 156 to the source of positive operating potential 63. A condenser 158 and a resistor 160 are connected between the anode 150 of the vacuum tube section 126 and ground. Similarly a condenser 162 and resistor 164 are connected between the anode 152 of the vacuum tube section 134 and ground. Diodes 166 and 168 are connected to the respective condensers 158 and 162. These diodes serve as a full wave rectifier the output of which is connected to a control grid 170 of a vacuum tube section 172. A grid leak resistor 171 is connected between the grid 170 and ground. The vacuum tube section 172 and a vacuum tube section 174 constitute a twin triode. An anode 176 of the vacuum tube section 172 and an anode 178 of the vacuum tube section 174 are coupled directly to the positive source of operating potential 63. Cathodes 180 and 182 are connected through respective resistors 184 and 186 to ground. A low pass filter network including resistors 189 through 192 and condensers 194 through 197 is connected between the cathode 180 of the vacuum tube section 172 and a control grid 198 of the vacuum tube section 174. An output signal taken across the cathode resistor 186 of the vacuum tube section 174 represents information or intelligence. The signal varies in amplitude with variations in frequency or phase of the modulated input wave applied to the primary winding 40 of the transformer 42.

The output signal from the vacuum tube section 54 has been followed through the amplifier 56, the second amplifier 80, mixer 126, 134, full wave rectifier 166, 168 and through vacuum tube sections 172 and 174. The output of the preamplifier 54 is also coupled from the condenser 65 to a control grid 200 of the vacuum tube section 202. The vacuum tube section 202 and a vacuum tube section 204 constitute a twin triode. Anodes 206 and 208 are coupled to the source of positive operating potential 63 through respective resistors 210 and 212. Cathode 214 of the vacuum tube section 202 is connected to ground through a cathode bias network including a condenser 216 and a resistor 218. The vacuum tube section 202 serves as an amplifier, the output of which is coupled through a condenser 220 to a control grid 222 of the vacuum tube section 204. A grid leak resistor 224 is connected between the grid 222 and ground. A resistor 226 and a condenser 228 serve as a phase shift network. The signal applied to the grid 222 of the vacuum tube section 204 is accordingly shifted 90 degrees with respect to the signal from the anode 206 of the vacuum tube section 202. Although the signal at the grid 202 is shifted behind by 90 degrees, it can be seen in view of the subsequent explanation that the phase shift might also be advanced by 90 degrees.

An output signal is taken from the anode 208 and coupled through a condenser 230 to a pair of diodes 232 and 234 which perform in the same manner as the diodes 84 and 86 to pass a signal only when the signal exceeds a small predetermined value. A resistor 236 is connected between the condenser 230 and ground, and resistors 238, 240, 242 are connected between the diodes 232, 234 and ground. A pair of diodes 244 and 246 are connected between the junction of the resistors 238 and 240 to opposite sides of the battery 98. In the same manner as previously explained with respect to the diodes 94 and 96, the diodes 244 and 246 limit the upper and lower levels of signals passed to a control grid 248 of a second amplifier 250. The control grid 248 is coupled to the junction of resistors 240 and 242. A cathode 252 is coupled through a cathode bias network including condenser 254 and resistor 256 to ground. A screen grid 258 is coupled through a condenser 260 to the cathode 252. A suppressor grid 262 is connected to the cathode 252. Positive operating potential from the battery 63 is supplied through resistors 264 and 266 to the screen electrode 258 and an anode 268 respectively. An output signal from the second amplifier 250 is coupled through a condenser 270 to a control electrode 272 of the vacuum tube section 134. A pair of diodes 274 and 276 serve to limit the upper and lower levels of any signal passed to the control grid 272 in the same manner as that previously explained with respect to the diodes 128 and 130. A condenser 278 and a resistor 280 serve as a differentiating network and correspond in function to the condenser 120 and resistor 122 previously described. A diode loading resistor 282 is connected between the diodes 274, 276 and ground. Since the signals applied to the differentiating network 278, 280 are substantially square waves, a positive and a negative voltage spike are supplied to control grid 272 of the vacuum tube section 134 of the mixer. The output signal of the tube section 134 is rectified and filtered to provide an output signal across the cathode resistor 186 of the vacuum tube 174 which represents intelligence or information. The amplitude of the signal across the resistor 186 varies according to frequency or phase variations of the modulated input wave applied to the primary winding 40 of the transformer 42.

In order to show how the frequency modulated input wave is treated at various points throughout the circuit in Fig. 2, reference is made to Fig. 3 and Fig. 3*a*. After a fresuency or phase modulated input wave is amplified in the vacuum tube sections 54 and 56 in Fig. 2, it may appear at the output of vacuum tube 56 with a waveform as shown by curve A in Fig. 3. The signal applied to the control grid 78 of the vacuum tube 80 in Fig. 2 may appear as shown at curve B in Fig. 3, curve B being exaggerated in size for purposes of illustration. Until the wave A in Fig. 3 exceeds the cutoff potential of the diodes 84 and 86 in Fig. 2, no signal is supplied to the control grid 78 of the second amplifier 80. This is indicated by the small portion 282 of the wave B in Fig. 3 which remains at a zero voltage level. As soon as the cutoff potential of the diode 86 is exceeded, it conducts and that portion of the sine wave in curve A below the positive potential of the battery 98 in Fig. 2 is supplied to the control grid 78. This is indicated by the portion 284 of the wave B in Fig. 3. As soon as the amplitude of the wave A in Fig. 3 exceeds the positive potential of the battery 98 in Fig. 2 the diode 96 conducts, and the signal level applied to the control grid 98 remains constant which in this instance is plus 3 volts. This is indicated by the flat top portion 286 of the wave B in Fig. 3. When the signal wave in wave A drops below the positive level of the battery 98 in Fig. 2, the diode 96 ceases to conduct and that portion of the sinusoidal wave below the 3 volts level of the battery 98 is applied to the control grid 78. This is indicated by the portion 288 of the wave B in Fig. 3. As soon as the sinusoidal wave decreases to a value below the conducting voltage of the diode 86, this diode ceases to conduct and no signal is supplied to the control grid 78. This is indicated by the portion 290 of the wave B in Fig. 3. At this time the signal wave A decreases to zero and commences to increase negatively on its negative half cycle. Thus the diode 86 in Fig. 2 helps to define the zero crossing by insuring that no signal reaches the central grid 78 during a change in polarity of the signal wave A in Fig. 3. As soon as the negative going wave exceeds the conducting potential of the diode 84, this diode conducts and the signal wave is supplied to the control grid 78 in Fig. 2. It is seen, therefore, that the portion 290 of the wave B in Fig. 3 remains at a zero level while both diodes 84 and 86 are nonconducting. After the diode 84 conducts the signal wave shown by the wave A in Fig. 3 it is applied to the control grid 78 in Fig. 2 until the negative potential of the battery 98 is exceeded. This portion of the wave supplied to the control grid 78 is indicated at 292 on the wave B in Fig. 3. As soon as the signal wave in curve A of Fig. 3 exceeds the negative potential of the battery 98 in Fig. 2 the diode 94 conducts and limits the amplitude of the signal applied to the control grid 78 to the negative level of the battery 98 in Fig. 2. This is indicated by the flat bottom portion 294 of the wave B in Fig. 3. As soon as the amplitude of the signal wave A decreases to a value less than the negative potential of the battery 98 in Fig. 2, the diode 94 ceases to conduct and that portion of the sinusoidal wave A in Fig. 3 below the level of the battery 98 is applied to the control grid 78 in Fig. 2. This is indicated by that portion 296 of the wave B in Fig. 3. When the wave A decreases to a value less than the conducting potential of the diode 84, this diode ceases to conduct and no signal is applied to the control grid 78 in Fig. 2. This is indicated by the portion 298 of the wave B in Fig. 3. For other cycles of the sinusoidal wave A applied to the input transformer 40 in Fig. 2, corresponding waveforms of the type shown as B in Fig. 3 are generated.

The waveform B of Fig. 3 is applied to the control grid 78 of the second amplifier 80. An amplified version of this wave which appears on the anode 100 is indicated by the waveform C in Fig. 3. The diodes 128 and 130 clip the upper and lower portions of the wave in excess of the plus and minus value of the battery 98. That portion of the wave C in Fig. 3 which is clipped is indicated by dotted lines, and that portion of the wave which is passed to the mixer 126 is indicated by the dark lines. By amplifying and clipping the wave B in Fig. 3 the substantially square wave C is secured. The small but substantially vertical portions 294 and 296 of the wave B and the steepness of the sine wave at a zero crossing aid the second amplifier 80 and clipping diodes 128 and 130 to provide a substantially square wave as shown in curve C of Fig. 3. The waveforms B and C shown in Fig. 3 are exaggerated for purposes of illustration. In practice the portions 298 and 300 of the wave C in Fig. 3 have very little, if any, horizontal offset, and for all practical purposes these edges of the square wave may be considered one substantially straight line such as indicated by waveform E in Fig. 3*a*.

If a frequency modulated wave D such as indicated in Fig. 3*a* is applied to the primary winding 40 of Fig. 2, it is amplified and clipped in the first amplifier and first clipper and then amplified and clipped again in the second amplifier and second clipper to produce a series of square waves E as indicated in Fig. 3*a* at the output of the second clipper which comprises diodes 128 and 130. These square waves are applied through a differentiating network comprising the condenser 120 and the resistor 122 which converts each square wave into a pair of voltage spikes, one plus and one minus, as indicated by F in Fig. 3*a*. These voltage spikes are applied to the control grid 124 of the mixer 126.

The frequency modulated input wave D of Fig. 3*a* is applied also through the lower or second network in Fig. 2. It is shifted 90 degrees by a phase shifting network comprising the resistor 226 and the condenser 228. The shift in phase is indicated by G in Fig. 3*a*. In the same manner that the wave D in Fig. 3*a* is shaped in the first network, the wave G is shaped in the second network. It is amplified and clipped in the first amplifier 204 and first clipper diodes 232, 236, then amplified and clipped again in the second amplifier 250 and second clipper diodes 274 and 276. The resulting square waves substantially as indicated as H in Fig. 3*a* are applied through a differentiating network comprising the condenser 278 and the resistor 280 which converts each square wave into a pair of voltage spikes I as indicated in Fig. 3*a*. These voltage spikes are applied to the control grid 272 of the mixer section 134. Because the frequency modulated wave G in Fig. 3*a* is shifted 90 degrees with respect to the frequency modulated wave D in Fig. 3*a*, the voltage spikes I in Fig. 3*a* are displaced in time with respect to the voltage spikes F in Fig. 3*a*. If the voltage spikes F and I of Fig. 3*a* are superimposed on a common time scale, they appear as indicated in Fig. 3*a* as pairs of positive and negative voltage spikes J. The first voltage spike of each pair is applied to the control grid 124 of the mixer section 126, and the second voltage spike of each pair is applied to the control grid 272 of the mixer section 134. For example, voltage spike 302 in Fig. 3*a* is applied to the control grid 124 of the mixer section 126 in Fig. 2, and the voltage spike 304 in Fig. 3*a* is applied to the control grid 272 of the mixer section 134 in Fig. 2. In a similar fashion the voltage spike 306 in Fig. 3*a* is applied to the control grid 124 in Fig. 2 and the voltage spike 308 is applied to the control grid 272 in Fig. 2. Thus it is seen that the control grids 124 and 272 in Fig. 2 each receive a negative pulse; then each receives a positive pulse, the sequence being repeated as long as a frequency modulated wave is applied to the primary winding 40.

The negative voltage spikes are inverted, and a series of positive voltage spikes appear at the output of the rectifiers 166, 168. The function of the inverters 18 and 26 in Fig. 1 is incorporated in the circuit which includes the mixer and full wave rectifier of Fig. 2. The manner in which the negative and positive voltage spikes applied to the input of the mixer in Fig. 2 are converted to a series of positive voltage spikes at the output of the full wave rectifier is perhaps best illustrated by analyzing the sequence of events which occurs when a pair of negative and a pair of positive voltage spikes are applied to the input of the mixer. Assuming that the negative voltage spike 302 in Fig. 3*a* is applied to the control grid 124 of the mixer section 126 in Fig. 2, the tube section 126 ceases to conduct current or decreases current conduction, and the potential at the anode 150 rises toward the positive potential of the battery 63. The potential of the voltage spike on the grid 124 then drops to zero causing the potential on the anode 150 to drop to a value determined by the impedance of the series circuit including the resistor 154, the vacuum tube section 126, the resistor 140, all of which are connected between the positive terminal of the battery 63 and a minus 150 volts source. Accordingly a positive voltage spike developed at the anode 154 is coupled through the condenser 158 and passed by the diode 166 to the control grid 170 of the amplifier section 172. Simultaneously with the decrease in current conduction of the vacuum tube section 126 and the lowering of the potential of the cathode 136, there is a corresponding decrease in the potential of the cathode 138 of the vacuum tube section 134. This causes an increase in current conduction of the vacuum tube section 134 and consequently a decrease in the potential at the anode 152. This decrease in potential is restored as soon as the negative voltage spike on the grid 124 of the vacuum tube section 126 terminates. The resultant negative voltage spike at the anode 152 of the vacuum tube section 134 is coupled through the condenser 162 to the diode 168. But the negative voltage spike is applied as a back voltage to the diode 168. Accordingly, the diode 168 does not conduct, and the negative voltage spike does not appear at the output of the diode 168. In a similar fashion when the negative spike 304 in Fig. 3*a* is applied to the control grid 272 of the vacuum tube section 134 in Fig. 2, a positive voltage spike appears at the anode 152 which is passed by the diode 168, and a negative voltage spike appears at the anode 150 which is blocked by the diode 166. Accordingly another positive voltage spike is passed to the control grid 170 of the vacuum tube section 172. Thus it is seen that two negative voltage spikes 302, 304 in Fig. 3*a* applied to the mixer tube sections 126, 134 in Fig. 2 cause a pair of corresponding positive voltage spikes 310, 312 in Fig. 3*a* on the output side of the diodes 166, 168 to the control grid 170 of the vacuum tube section 172. The positive voltage spikes K in Fig. 3*a* represent the output from the diodes 166, 168 in Fig. 2 to the control grid 170 of the vacuum tube section 172.

When the positive voltage spike 306 in Fig. 3*a* is applied to the control grid 124 of the mixer section 126 in Fig. 2, current conduction of the vacuum tube section 126 increases temporarily, then decreases when the voltage spike terminates. This causes a negative voltage spike at the anode 150 which is blocked by the diode 166. Because of the additional current conduction in the vacuum tube section 126 its cathode potential increases. Accordingly the potential at the cathode 138 of the vacuum tube section 134 increases, thereby temporarily decreasing the current conduction of the vacuum tube section 134. Accordingly, a positive voltage spike results at the anode 152 which is passed by the diode 168. The positive voltage spike passed by the diode 168 is represented as positive voltage spike 314 in Fig. 3*a*. In a similar fashion the positive voltage spike 308 in Fig. 3*a* applied to the control grid 272 of the vacuum tube section 134 in Fig. 2 causes a negative voltage spike at the anode 152 which is blocked by the diode 168 and a positive voltage spike at the anode 150 which is passed by the diode 166. This positive spike is represented at 316 in Fig. 3*a*. Thus it is shown how a pair of negative spikes 302, 304 followed by a pair of positive spikes 306, 308 in Fig. 3*a* cause a series of four positive spikes 310, 312, 314, and 316 in Fig. 3*a* to be supplied to the control grid 170 of the vacuum tube section 172 in Fig. 2. These positive voltage spikes are applied to a low pass filter which includes the resistors 189—192 and condensers 194—197. The filter section serves to provide an output signal to the control grid 198 of the vacuum tube section 174 which represents an average level of the positive voltage spikes. Accordingly the output signal taken across the resistor 186 in Fig. 2 is a demodulated signal which represents intelligence or information. This signal is obtained by rectifying and filtering four positive voltage spikes for each cycle of the frequency modulated input wave. The intelligence included in the frequency modulated signals D and G of Fig. 3*a* is represented by the wave 318 in Fig. 3*a*. An average signal for each four positive spikes K in Fig. 3*a* is indicated by the dotted line wave 320 in Fig. 3*a*. While the invention has been illustrated and described with respect to a frequency modulated input wave, it is to be understood that the demodulator circuit of this invention may be equally well employed with a phase modulated input wave.

Thus it is seen that a novel demodulator is provided which converts each cycle of a frequency modulated wave into a series of pulses which are mixed, rectified and filtered to provide a signal which varies in amplitude according to the frequency variations in the input wave. The frequency modulated input wave is applied to two networks, one of which is shifted in phase with respect to the other whereby twice as many voltage spikes are secured than is normally secured by the use of a single network. In the process the desired signal may be increased by a factor of two whereas the noise signal is increased by a factor of 1.414. The increase in noise by the factor of 1.414 represents the usual value the noise signal may be increased for wide bandwidths.

What is claimed is:

1. In a discriminator for frequency and phase modulated waves comprising means for sensing received modulated waves during a predetermined portion of each half-cycle of the waves to provide a first signal representative of the modulation, means responsive to said received waves for delaying the received waves and for sensing the delayed modulated waves during the predetermined portion of each half-cycle of the waves to provide a second signal representative of the modulation, and means for combining the first and second signals to provide a composite signal having a signal to noise ratio which is greater than that for either the first or the second signals.

2. A discriminator for frequency and phase modulated waves comprising an input circuit for receiving the modulated waves, a plurality of means coupled to the input circuit for sensing the modulated waves during two different portions of each half-cycle of the waves to provide signals having periodicity representative of the modulation, one of said means including time delay means, and a frequency-responsive network coupled to said plurality of sensing means for providing output signals having a waveform which corresponds to the modulation of the modulated waves.

3. A discriminator for frequency and phase modulated waves comprising an input circuit for receiving the modulated waves, means coupled to the input circuit for producing a pulse signal each time that the respective half-cycles of the waves change polarity, means including time delay means coupled to the input circuit for producing a pulse signal each time that the respective half-cycles of the undelayed waves attain maximum amplitude, means coupled to both of the pulse producing means for combining the pulse signals, and a frequency-responsive network coupled to the combining means for providing output signals having a waveform which corresponds to the modulation of the frequency modulated waves.

4. A discriminator for frequency modulated waves comprising an input circuit for receiving the waves, means coupled to the input circuit for producing a pulse signal each time that the respective half-cycles of the waves change polarity, a phase shifter coupled to the input circuit, means coupled to the output of the phase shifter for producing a pulse signal each time that the respective half-cycles of the phase-shifted waves change polarity, means for combining the pulse signals, and a frequency-responsive netwark coupled to the combining means for providing output signals having a waveform which corresponds to the modulation of the frequency modulated waves.

5. A discriminator for frequency and phase modulated waves comprising an input circuit for receiving the waves, means coupled to the input circuit for producing a pulse signal each time that the respective half-cycles of the waves change polarity, a phase shifter coupled to the input circuit for providing a 90° phase shift, means coupled to the output of the phase shifter for producing a pulse signal each time that the respective half-cycles of the phase-shifted waves change polarity, means for combining the pulse signals, and a low pass filter network coupled to the combining means for providing output signals having a waveform which corresponds to the modulation of the modulated waves.

6. A demodulator comprising an input circuit for receiving frequency and phase modulated input waves, a first and second network coupled to said input circuit, each network including an amplifier and clipper for producing an output signal each time the applied signal changes polarity, said second network including a phase shift device whereby the output signal of the second network is displaced in time from the output signal of the first network, means for combining the output signals of the first and second networks and a filter network coupled to the means for combining the output signals, said filter network providing an output signal which varies in amplitude with the modulation of the wave at the input circuit.

7. A demodulator having an input circuit for receiving frequency and phase modulated waves, first and second networks coupled to said input circuit, each network including a detector which provides an output signal each time the input wave makes a zero crossing, a phase-shifting network located in one of said networks for displacing the output signal of one network with respect to the other, means for combining and filtering the output signals of said first and second networks whereby said last named means provides an output signal which represents a modulation of the wave applied to said input circuit and the signal to noise ratio of the output signal from said last named means exceeds the signal to noise ratio of the output signal from either the first or second networks.

References Cited in the file of this patent

UNITED STATES PATENTS

| | | |
|---|---|---|
| 2,510,983 | Krause | June 13, 1950 |
| 2,720,584 | Slaughter | Oct. 11, 1955 |
| 2,770,727 | Hupert et al. | Nov. 13, 1956 |